United States Patent [19]

Morgan

[11] 4,090,005
[45] May 16, 1978

[54] PROTECTIVE ARMOR WITH PANELS MOVABLE WITH RESPECT TO EACH OTHER

[76] Inventor: James L. Morgan, 6311 Yucca St., Los Angeles, Calif. 90026

[21] Appl. No.: 528,438

[22] Filed: Nov. 29, 1974

[51] Int. Cl.² ............................................. F41H 5/08
[52] U.S. Cl. ................................... 428/76; 428/213; 428/251; 428/252; 428/911
[58] Field of Search ................. 89/36 A, 36 D; 2/2.5; 109/15, 49.5; 428/76, 246, 251, 252, 265, 267, 107, 911, 213

[56] References Cited

U.S. PATENT DOCUMENTS

| 2,399,184 | 4/1946 | Heckert | 89/36 A |
|---|---|---|---|
| 2,640,987 | 6/1953 | Ehlers | 89/36 A |
| 2,861,021 | 11/1958 | Dietz et al. | 89/36 A |
| 3,000,772 | 9/1961 | Lunn | 428/911 |
| 3,292,181 | 12/1966 | Kennedy et al. | 2/2.5 |
| 3,486,966 | 12/1969 | Allen et al. | 428/911 |
| 3,519,529 | 7/1970 | Cook | 428/911 |
| 3,562,810 | 2/1971 | Davis | 2/2.5 |
| 3,575,786 | 4/1971 | Baker et al. | 428/911 |
| 3,577,306 | 5/1971 | Baker et al. | 428/911 |
| 3,783,449 | 1/1974 | Davis | 2/2.5 |

Primary Examiner—Marion E. McCamish
Attorney, Agent, or Firm—Christie, Parker & Hale

[57] ABSTRACT

Flexible protective armor is made from a stack of flexible panels selected from four groups of panels. Each of the panels in the first group of the stack is a single sheet of woven material of high tensile strength. Each of the panels in the second group includes two or more layers of woven material of high tensile strength, and which have been bonded together. Each of the panels in the second group is separated by a layer of plastic film. Each of the panels in the third group is a single layer of tightly woven frangible material. Each of the panels in the fourth group is a layer of tightly woven material of high tensile strength which has been impregnated on one side with a flexible plastic adhesive. Adjacent surfaces of the panels in the stack are substantially unbonded. The edges of the stack are sealed to limit the escape of air from the stack when struck with a projectile.

37 Claims, 3 Drawing Figures

U.S. Patent     May 16, 1978     4,090,005
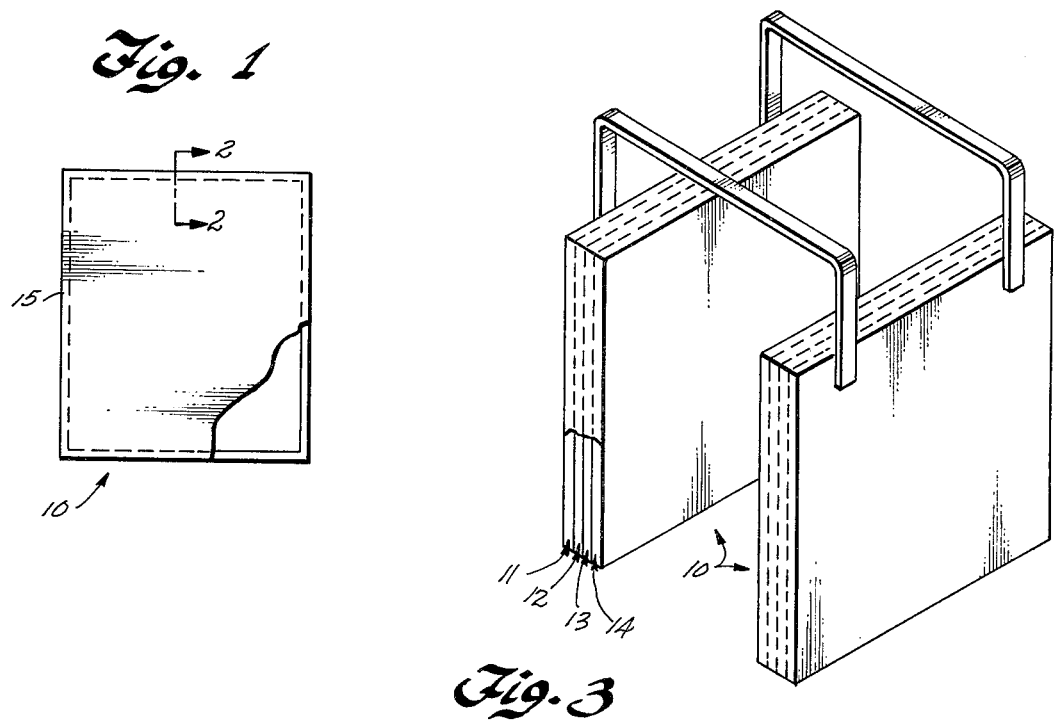
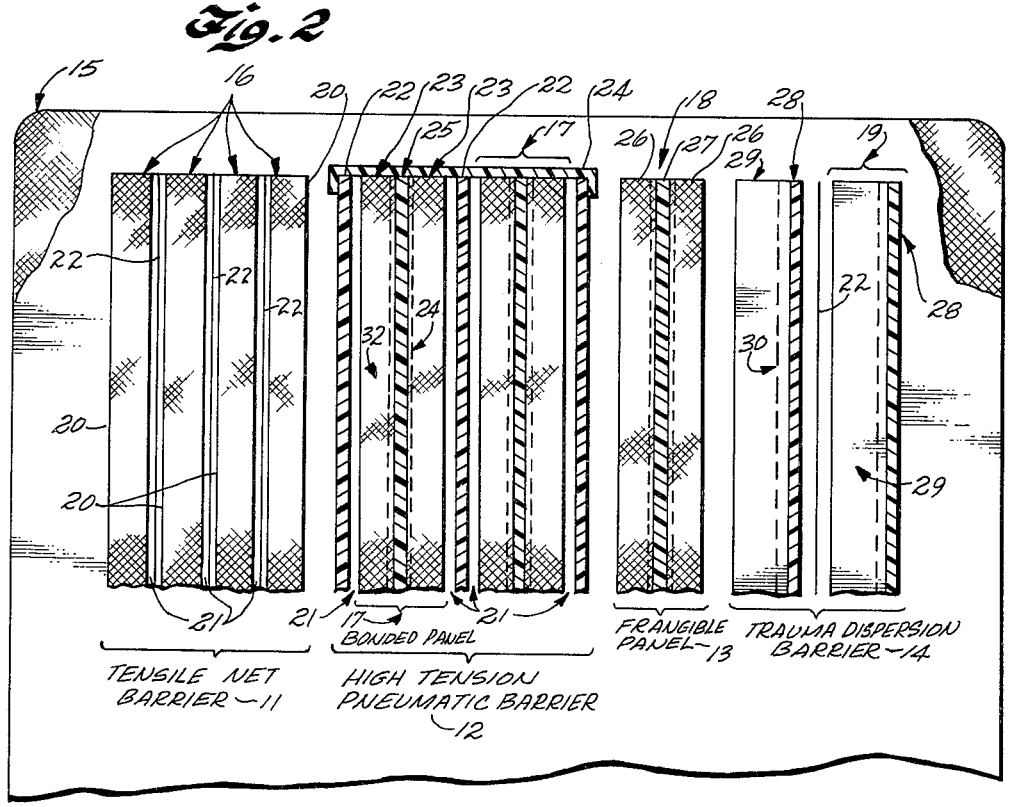

PROTECTIVE ARMOR WITH PANELS MOVABLE WITH RESPECT TO EACH OTHER

BACKGROUND OF THE INVENTION

1. Field of the Invention

This invention relates to barriers or armor used as protection against bullets or other projectiles of relatively high velocity.

2. Description of the Prior Art

Many different types of armor have been used in the past. However, the prior art armor is heavy, or rigid, or both, and it causes such discomfort to the wearer that it often is not worn, or does more harm than good. Examples of prior art armor are shown in the following U.S. Pat. Nos.: 2,399,184; 2,640,987; 2,697,054; 2,778,761; 3,061,839; 3,409,907; 3,557,384; 3,577,306 and 3,783,449.

This invention provides lightweight, relatively comfortable armor with projectile-stopping ability superior to any of the prior art armor. The cost of the armor is relatively low, and it can be flexible for greater comfort when worn on the body.

SUMMARY OF THE INVENTION

The protective armor of this invention is made from a stack of two or more panels selected from a group of four differently and uniquely arranged materials which can be used separately or together in various combinations to provide a matrix of reactive forces which oppose the force of a projectile. The opposing forces thus obtained include tensile strength, interlaminar shear, compressive forces, pneumatic forces, trituration and radial stress.

Each panel in the first group, which is called the tensile net barrier, includes one or more sheets of a fibrous or woven material of high tensile strength. The sheets are stacked loosely together, and preferably are made by folding a larger sheet rather than by cutting separate sheets.

Each panel in the second group, which is called the high tension pneumatic barrier, includes at least two adjacent sheets of a fibrous or woven material of high tensile strength. The sheets are secured together with a layer of bonding agent, and adjacent surfaces of the panels in the second group are substantially unbonded. Each of the panels in the second group is preferably loosely faced with a thin sheet of airtight plastic film, or thin tightly woven cloth which is airtight, and the edges of the stack thus formed are preferably sealed to be airtight.

Each panel in the third group, which is called the frangible barrier, includes one or more sheets of a material (say, glass fibers) more brittle or frangible than the material in the panels of the first or second groups. If two or more sheets of frangible material are used in each panel of the third group, the sheets in each panel are bonded together with a layer of adhesive. Adjacent surfaces of the panels of the more brittle material in the group are also preferably substantially unbonded.

Each panel in the fourth group, which is called the trauma dispersion barrier, includes one or more sheets of a fibrous or woven material of high tensile strength and coated on one side with a flexible plastic.

Preferably the layer of bonding agent used in the panels is substantially thinner than the sheets. The high tensile strength material is a synthetic organic material and is tougher than the more brittle material, which may be selected from the group consisting of glass, graphite, asbestos and boron carbide.

The edges of the stack are preferably sealed to make the interior of the stack relatively airtight, and thereby improve the ability of the stack to stop missiles. Preferably the stack is sealed in an airtight, close-fitting, waterproof bag.

A typical stack includes from one to about ten panels (made of the high tensile strength fiber) in the first group; about two to about twenty-four bonded panels in the second group, with an equal number of interfacing layers of thin plastic film; one to about eight panels in the third group; and about one to about four panels in the fourth group.

Preferably the high tensile strength sheets are between about 0.005 and about 0.020 inches thick, and are each at least three times as thick as the layer of bonding agent which bonds them together. Preferably the total thickness of layers of bonding agent is less than about five percent of the total thickness of the sheets bonded together.

Examples of the synthetic organic plastic fibers with high tensile strength are the well known polycarbonates, polyamides, polyesters, acetal resins and the like.

As explained more fully below, armor of various stopping power, weight, and cost can be made by combining panels from one or more of the four groups in stacks of different arrangements.

BRIEF DESCRIPTION OF THE DRAWINGS

FIG. 1 is an elevation of the protective armor disposed in an airtight bag;

FIG. 2 is a fragmentary view taken on line 2—2 of FIG. 1; and

FIG. 3 is a perspective view of two stacks of panels disposed in accordance with this invention, and arranged to be worn in front and in back of a person.

Referring to the Figures, a relatively thin rectangular stack 10 of a first group 11 of panels 16, a second group 12 of panels 17, a third group 13 of panels 18, and a fourth group 14 of panels 19 is disposed within a snugly fitting airtight waterproof bag 15, which may be of any suitable material, such as vinyl or tightly woven nylon. The protective power of the armor is improved by the pneumatic properties provided by the airtight bag. Moreover, the protective power of the stack decreases if it becomes wet, so the waterproof characteristic of the bag helps to maintain the protective power of the armor.

As shown best in FIG. 2, each panel 16 in the first group 11 is a single, rectangular sheet 20 of woven fibers, placed loosely together and separated by a natural air space 21 between adjacent sheets. Preferably, the fibers in the sheets are a high tensile strength synthetic organic plastic material, such as, the well known polycarbonates, polyamides, polyesters, acetal resins, and the like. Suitable materials are available under trademarks such as NYLON, MARLEX, DELRIN, KEVLAR, NOMEX and DACRON. In general, the higher the tensile strength of the fiber, the more satisfactory it is for use in this invention. The relationship of the denier of the threads to the number of picks to the inch of woven material is important. The function of the panels in the first group is to act as a high velocity net which catches the projectile, and in effect, enshrouds the projectile in layers of the woven material which build up in front of it. Each layer therefore must be of low mass relative to the tightness of the weave. Material which is tightly woven and of high mass will allow puncture shear forces to become established, and the projectile will punch through, thus defeating its effectiveness. The material must be loose and unconstrained, thereby allowing it to achieve substantially the velocity of the projectile to avoid punching through. For example, sheets of KEVLAR (a polyamide) cloth an plain weave, 13 mils thick, 17 × 17 construction, 1400 denier and weighing 6.8 oz. per sq. yd. make highly effective panels for the first group (the "tensile net barrier"). Another effective material is KEVLAR cloth 6 mils thick, 62 × 62 construction, 400 denier and weighing 3.2 oz. per sq. yd. However, in this latter case twice as many layers must be used compared to the preceding example. As another comparison, KEVLAR cloth, 14 mils thick, 24 × 24 construction, 1500 denier and weighing 9 oz. per sq. yd. punches through more easily and is not as effective.

As shown in FIG. 2, each panel 17 in the second group 12 includes two identical congruent, rectangular sheets 23 of woven fibers. The entire area of adjacent surfaces of the two sheets 23 in each panel 17 are bonded together by a thin layer 25 of bonding agent. The sheets of woven fibers can be of the same type as used in the first group of panels. They need not be tightly woven. In fact, better results are obtained in this invention if the fibers are made into a yarn which is rather loosely woven into a fabric from which the sheets are formed. The thickness of each sheet is preferably in the range of about 0.004 to about 0.024 inch.

The bonding agent can be of any suitable material which effectively bonds the adjacent surfaces of the two sheets together. Preferably, the bonding agent is a flexible thermoplastic material, such as, a polyester, polyurethane, or polyethylene. Suitable bonding agents are available under the trademarks of PELON and MYLAR. The thickness of the bonding layer should be in the range of about 0.0005 inch to about 0.003 inch. The more bonding agent used the better the trauma reduction. However, if substantially over 0.003 inch is used the resulting panel becomes too stiff and has less stopping power for reasons explained below.

Any suitable number of panels in the second group can be used. The more panels used, the better the stopping power of the stack. Ordinarily, between two and about 15 panels of the type just described are adequate to stop the great majority of bullets or projectiles likely to be encountered in police work or battlefield conditions.

As shown in FIG. 2, each panel in the second group includes only two sheets bonded together. If desired, three or four sheets (not shown) can be bonded together in each panel. However, as explained below, as the number of bonded sheets in each panel increases above about three or four, the stopping power of the stack decreases. Opposing surfaces of adjacent panels are completely unbonded, or are substantially completely unbonded. This leaves adjacent panels free to move easily relative to each other.

The two sheets 23 of each panel 17 are bonded together by laying one of the fibrous sheets on a flat work surface, and disposing a congruent sheet of polyethylene, Pelon 25, or any other suitable bonding agent of about 1 mil thickness on the first sheet. The second fibrous sheet is then disposed on the polyethylene sheet. A heavy flatiron heated to about 400° F. is applied to the top surface of the second sheet, causing the PELON layer to soften and penetrate the adjacent surfaces of the two sheets of woven fibers. The penetration of the bonding agent into each fibrous sheet is relatively small compared to the total thickness of each sheet and is indicated by a pair of vertical dotted lines 24 on opposite sides of the bonding agent layer.

Each bonded panel 17 in the second group (the high tension pneumatic barrier) is separated from an adjacent panel 17 by a thin plastic film 22 of about 0.0005 inch to 0.003 inch in thickness. Plastic films which have been used effectively are polyethylene, nylon, polycarbonate, or polyurethane. The edges of the panels in the second group are sealed with a piece of adhesive tape 24 which spans the adjacent edges of the panels 17 and films 22 and extends around their entire respective peripheries to enclose all the air spaces between the airimpermeable plastic films. Thin, airtight, tightly woven cloth such as nylon or Dacron has also been used in place of the plastic films with equally good results.

Improved performance of the entire stack has also been obtained by placing a sheet 22 of plastic film between adjacent panels in the entire stack of panels.

The bonded panels 17 of the second group can be effectively replaced by single sheets if they are prepared in the following manner. The cloth is first woven with either a mixture of different threads of different melting points or threads coated with a thin plastic coating. The material thus woven can be lightly heated or sprayed with a solvent to provide adhesion among the fibers and thereby allow the force of the projectile striking a few threads to be spread throughout the sheet.

The panels 18 in the third group 13 are made of sheets 26 of flexible frangible material such as woven glass fibers. Graphite, asbestos, and boron carbide can be substituted for, or mixed with, the glass fibers in the sheets 26. Although woven construction is preferred, the fibers in the sheets 26 can be matted or secured together in any other suitable fashion. For stability the sheets of glass fibers can be secured together with a layer 27 of bonding agent in the same manner as the sheets in the second group 12, and still retain their effectiveness as long as the bonding material is not over about 1 mil in thickness and not over about two or about three sheets are bonded together. In the particular example shown in FIG. 2, the sheets are glass fibers of plain weave, 14 mils thick and weigh 12 oz. per sq. yd. The panels in the third group can be omitted from the stack if the armor is intended to stop only low velocity projectiles of soft lead such as 0.22, 0.32 or 0.38 caliber. However, as explained below, the use of the panels in the third group greatly improves the stopping power of the stack.

As shown in FIG. 2, each panel 19 in the fourth group 14 is a single rectangular sheet 29 of woven fibers of high tensile strength and which has been impregnated on one side with a thin coating of vinyl 28, or other suitable plastic material. The depth of impregnation of vinyl into the woven material is shown by the dotted line 30 and should be substantially less than the thickness of the woven material. The thickness of the vinyl should be from about five percent to about thirty percent of the thickness of the woven material. The woven material used as shown in FIG. 2 is ballistic nylon of 1400 denier and weighs 12 oz. per sq. yd. Other suitable materials, such as, KEVLAR or DACRON, of high tensile strength can be used. However, ballistic nylon, due to its elasticity, shows superior performance and is less susceptible to spalling or rupturing of the back face.

In a typical stack as shown in FIG. 3, sixteen panels are included in the first group, four two-ply bonded panels wrapped and sealed in one-half mil polyethylene film are included in the second group, four single panels of fiberglass cloth are included in the third group, and two vinyl-coated nylon panels are included in the fourth group. All of these panels arranged and constructed in an airtight bag as described above, and having dimensions of 12½ inches by 14 inches, by less than one-half inch thick, weighs about two pounds. The armor thus constructed is soft, flexible and comfortable to wear and has amazing stopping power. The stack can stop any hand gun. For example, a 0.44 caliber magnum Winchester Luballoy cartridge fired from a Ruger pistol with a 7½ inch barrel at a range of 3 feet penetrated only the first group of panels. Moreover, the indentation in soft clay behind the armor was less than 1 inch, indicating the backface loading and blunt trauma to the body would be easily survivable.

To provide a fuller understanding of the uniqueness of the armor provided by this invention, it will be useful to explain the action of a bullet on the material in the stack.

As the bullet strikes the unbonded front panels of woven fibers of high tensile strength, the panels form a net which in effect catches the bullet. The unrestrained panels, which are relatively low in mass, are able to accelerate rapidly and achieve the velocity of the projectile for the short distance of compression of the entire stack. Moreover, since the fibers or strands of thread are loosely woven, the strands are pulled along with the projectile instead of being broken. A mass of material therefore builds up in front of the projectile, effectively increasing its cross-sectional area.

The following test was performed to demonstrate the effect just described. The sixteen loose, unbonded layers of the first group were replaced by an equal number of bonded layers of the same material. The 0.44 caliber bullet, previously stopped, easily penetrated the entire stack. The reason for this is that the rigidity of the bonded panels allowed punching shear forces to become established which is the mode of least strength of the material.

Continuing with the explanation of the action of the projectile on the armor, as the net formed by the first group of panels enshrouds the projectile, the entire stack is compressed. The natural air spaces between the panels and plastic film layers in group two are compressed. Supersonic air flow in the narrow spaces between layers causes stiffening of the entire stack and provides pneumatic cushioning, resulting in deceleration of the projectile. Moreover, the lateral compression of air between adjacent panels and the momentary stiffening resulting therefrom, spreads the force of impact and thereby reduces blunt trauma to the body.

The following test was performed to demonstrate the effect just described. Eight panels of two KEVLAR sheets bonded together as described above and faced with plastic film were arranged in a stack of eight 2-ply panels. Four panels of two sheets of woven glass fibers bonded as described above were placed behind the eight 2-ply panels of KEVLAR. When this stack was placed in a sealed plastic bag, a 9 mm., 125 grain bullet fired from a Browning high-power pistol at a range of 6 ft. was easily stopped. The airtight plastic bag was removed, and the same test repeated. The bullet easily penetrated the entire stack. The edges of the stack were then sealed with friction tape. The test was repeated, and the bullet was again easily stopped. These tests demonstrate the effectiveness of the pneumatic action in the stack as one of the reactive forces opposing penetration by a projectile.

The pneumatic effect can be further increased by passing the various sheets through scored rollers to provide indentations between 1 and 2 mils deep. This provides a greater quantity of trapped air with a corresponding improvement in effectiveness.

Continuing with the explanation of the action of a bullet on striking the stack, as the material is compressed and bent in the path of a bullet, the bonded sheets in the panels of the second group are unable to slide relative to each other due to the high coefficient of friction between the bonded surfaces. This resistive force causes stress lines to develop radially in the bonded sheets, causing a severe distortion of the material, which in turn opposes the compression of the panels in the stack. There is a resulting further loss of kinetic energy of the bullet, and a corresponding deceleration. As compression is completed, all of the panels attempt to move axially in the path of the bullet. The acceleration of the central portion of the stack in relation to the peripheral area gives rise to massive radial stresses and interlaminar shear forces due to the thin bonding layers between sheets in the panels. Large amounts of kinetic energy are absorbed, and the forces imparted to the bonded sheets tend to accelerate the entire sheet axially in the direction of the bullet. The force of the bullet is therefore distributed to the body behind the stack more evenly, and over a larger area. This drastically reduces the shock to the body, and is of principal importance in the reduction of body trauma.

The importance of bonding the panels in the second group in improving the resistance to both penetration and trauma was demonstrated by the following tests.

A 9 mm. Winchester jacketed 115 grain bullet was fired into 14 layers of unbonded KEVLAR material as previously described and the bullet completely penetrated the material. The same bullet when fired into the same number of layers bonded as described above was easily stopped and showed one inch depression in soft clay placed behind the test panel.

The number of bonded layers was decreased to twelve, and the bullet penetrated. Four panels of fiberglass cloth as described above were then placed behind the twelve panels previously penetrated as part of the same test series. The bullet was easily stopped and the depression in the clay was only one-half inch. Moreover, upon examination of the bullet it was found that the bullet was completely flattened, showing the effectiveness of the trituration process of the third group of frangible panels which will be described below.

Continuing the explanation of the interactions occurring within the stack, as the above described phases are completed and full compression achieved, the panels of fiberglass in the third group react from impact of the bullet against the front panels. Keeping in mind the high rate of reaction, the fiberglass panels react to the bullet with the rigidity of a stone wall for about 30 to about 40 microseconds. This causes a massive deformation of the bullet, increasing its cross-sectional area considerably. At the same time, the fiberglass in the path of the bullet is triturated to a powder, thus absorbing additional kinetic energy, and indicating the violence of the interaction of the bullet and the materials in the stack. The impact with the fiberglass panels takes place through the KEVLAR panels, which have not yet been penetrated. The end result is a massive decrease in the kinetic energy of the bullet over a very short period of time, and over a relatively large area, compared to the cross-sectional area of the bullet.

As indicated previously, the thickness of the bonding layer (if used) between adjacent sheets in the fiberglass panels is important. This bond stabilizes the fiberglass sheets and permits a lateral translation of shock energy, thereby assisting in decreasing blunt trauma to the body. I have found that up to about 3 mils of bonding agent can be used successfully. The more bonding agent used, the better the trauma reduction; however, if the thickness of the bonding agent is substantially over 3 mils, the resulting cushioning effect defeats the trituration process, thereby nullifying the energy-absorbing effect just described for the fiberglass panels.

As the trituration phase in the fiberglass panels is completed and the bullet is deformed, the axial displacement of the material in front of the bullet places the KEVLAR fibers in tension, the mode of greatest strength. Since the cross-sectional area of a bullet is proportional to the square of the radius of a bullet, the number of fibers placed under tension is also related exponentially to any increase in the radius of the bullet during the trituration phase. As the increased numbers of fibers are placed in tension, the high coefficient of friction between the strands in the bonded interface of the panel prevents pulling of the strands and allows the full limit of tensile strength to be utilized, causing the strands to fail in tension until the bullet is stopped.

With the completion of the compression and trituration phases, and the dispersion of initial forces of impact over the large area of the backface, and thereby to the body, the final stretching and maximum tensile forces on all panels occurs directly in the path of the bullet. The panels in the fourth group (trauma dispersion barrier) now play a critical role. If these panels are stiff and inelastic, there will be a spalling effect, allowing the backface to punch out, thereby allowing all of the fibers in the path of the bullet to achieve a mode of punching shear, and the projectile will completely penetrate. These panels must therefore be flexible, have a high degree of elasticity, and be extremely tough in order to function properly. Panels of ballistic nylon coated on one side with vinyl perform very effectively. Due to the toughness and elasticity of this arrangement, the final deceleration of the projectile occurs gradually enough to prevent rupturing of the stack and at the same time distributes the energy over the entire backface. Trauma reduction up to fifty percent can be achieved with only two panels of this material weighing less than six ounces.

The thickness of the bonding agent in the KEVLAR panels of the second group is also critical to insure that the fibers are able to achieve maximum tensile load. Between about onehalf to about 3 mils of polyethylene, Pelon, or Mylar appears to be the critical range. If more than this amount is used, the KEVLAR panels become stiff, permitting punching shear forces to rupture the material in shear, its weakest mode. To permit the fibers to fail in tension, there must be a degree of elasticity in both the fibers and the bonding agent to permit sufficient axial displacement and thus avoid excessive punching shear forces. For example, if all the sheets in fourteen panels of KEVLAR are bonded together, the 9 mm. bullet easily passes through all of them. This is due to the fact that the increased stiffness prevents the displacement of the fibers in the path of the bullet by the slight amount needed to permit the fibers to achieve a position to exert maximum tensile forces. Generally, not over about 5 percent bonding agent by weight should be used, and not more than three or four sheets of material should be bonded together in any panel to avoid decreasing the stopping power of the stack.

The optimum position for the fiberglass panels (frangible panels) in the third group of the stack varies with each type of bullet used. Generally, the more frangible panels are most effective at the rear of the stack, and not in front. For some types of bullets, the stack performance is improved if two or three more frangible panels are used at spaced intervals. Placement of a single frangible panel in the center of the stack is also acceptable, except for the 0.44 magnum cartridge.

Because of the criticality of the location of the panels of more brittle (frangible) material, it is imperative that the panels with the more brittle material be on the back side of the stack, i.e., on the far side of the stack from the expected impact of the projectile to be stopped. This is shown in FIG. 3 where two stacks 10 of panels from the first, second, third and fourth groups are secured together at their top edges by straps 30 which rest on the shoulders of the person (not shown) wearing the stacks. The inner surface of each stack contains the fourth group of panels, and next to that are the third group panels, which contain the more brittle material. The outer portions of each stack contain the first and second group panels of the compressible, high tensile strength fibers.

Since the cost of materials varies greatly, it is sometimes more economical to use a mixture of materials. However, care must be taken not to use two sheets of woven fibers with high tensile strength with a sheet of the frangible material bonded between them, because this arrangement sets up shear forces which decrease the stopping power of the stack.

Nylon and Dacron sheets bonded together with Pelon and nylon and KEVLAR (an aromatic polyamide) sheets bonded together with Pelon have produced a useful armor stack. The same is true for nylon and graphite sheets bonded with Pelon, and KEVLAR and fiberglass sheets bonded with polyethylene.

The following Table I demonstrates the effectiveness of armor made in accordance with this invention as compared to conventional prior art arrangements.

TABLE I

| Gun & Cartridge at 6' Range | Material[o] | Result |
|---|---|---|
| Smith & Wesson 6½ Barrel .44 Magnum 240 grain Remington | 9 panels of 2-ply bonded KEVLAR + 4 panels of 2-ply fiberglass | Bullet stopped in 4th panel |
| Smith & Wesson 6½ Barrel .44 Magnum 240 grain Remington | 20 layers of unbonded KEVLAR identical with the KEVLAR in the above example | Complete penetration by the bullet |
| Browning High Power 9 mm. 115 grain Winchester full metal jacket | 6 panels of 2-ply bonded KEVLAR + 2 panels of 2-ply fiberglass | Bullet stopped in 3rd panel |
| Browning High Power 9 mm. 115 grain Winchester full metal jacket | 2 panels of 2-ply fiberglass + 6 panels of 2-ply bonded KEVLAR | Complete penetration by the bullet |
| Browning High Power 9 mm. 115 grain Winchester full metal jacket | 12 layers of bonded KEVLAR | Complete penetration by the bullet |
| Browning High Power 9 mm. 115 grain Winchester full metal jacket | 8 panels of 2-ply bonded nylon + 4 panels of 2-ply bonded fiberglass | Bullet stopped in 6th panel |
| Browning High Power 9 mm. 115 | 20 layers of unbonded nylon | Complete penetration |

TABLE I-continued

| Gun & Cartridge at 6' Range | Material* | Result |
|---|---|---|
| grain Winchester full metal jacket | | by the bullet |

*Listed in the order of impact from the bullet.

The four groups described above which comprise this invention can be used in various arrangements, either together or separately, depending on the type of armor to be produced.

It has been found that a wide variety of effective armor can be produced with this invention to meet virtually any type of threat level. Since there are many types of cartridges and hand guns, the following Table II has been prepared to show the required number and types of panels from each of the four groups to provide armor which meets various threat levels. Armor weight and the depth of indentation in duct seal (a clay-like plastic material) in contact with the rear face of the stack is also included in the Table.

TABLE II

| Threat Level | ARMOR CONSTRUCTION | | | | Weight (One side) 12 ½" × 14" | Trauma Depression in Duct Seal |
|---|---|---|---|---|---|---|
| | First Group | Second Group | Third Group | Fourth Group | | |
| .44 Ruger 7½" 240 grain WW Luballoy | 16 | 4 2-ply bonded panels separated with 1 mil polyethylene film | 2 | 2 | 32 oz. | 1¼" |
| | 14 | 4 2-ply bonded panels separated with 1 mil polyurethane film | 0 | 0 | 25 oz. | 1⅝" |
| .44 Smith & Wesson 6½" 240 grain Remington JSP | 4 | 8 2-ply bonded panels separated with 2 mil Nylon 66 | 4 | 2 | 29 oz. | ¾" |
| | 10 | 4 2-ply bonded panels separated with 1 mil polyethylene film | 4 | 0 | 22 oz. | 1¾" |
| | 0 | 10 2-ply bonded panels separated with 2 mil Nylon 66 | 0 | 2 | 30 oz. | ⅝" |
| .357 Magnum S&W with 6" barrel 158 grain Western jacketed hollow point | 4 Nylon (12 oz.) | 6 2-ply bonded panels separated with 1 mil polyethylene | 4 | 0 | 20 oz. | ¾" |
| 9 mm. Browning High Power 115 grain Western full metal jacket | 0 | 6 2-ply bonded panels separated with 1 mil polycarbonate film laminated to ½ mil polyethylene film | 8 | 0 | 18 oz. | ⅝" |
| .22 Cal., .32 Cal., and .38 Cal. | 0 | 3 2-ply bonded panels. No plastic film separator required. | 4 | 0 | 10 oz. | ¼" |

NOTE: Each configuration will stop all threat levels below it.

Within the limitations indicated above, the different panels in various number can be selected and arranged to provide the required protection at an acceptable cost and weight.

In summary, this invention provides an improved armor which is lightweight, relatively inexpensive, and can be flexible for comfort and maximum mobility of the wearer.

I claim:

1. Protective armor comprising a flexible stack of flexible panels, each panel including between about two and about four sheets of woven fibrous ballistic material secured together with a flexible layer of bonding agent, the thickness of the layer being substantially less than the thickness of the sheets, and the panels in the stack being movable with respect to each other.

2. Armor according to claim 1 in which the major portions of the adjacent surfaces of the sheets in each panel are secured together.

3. Armor according to claim 1 in which the major portions of the adjacent surfaces of adjacent panels are substantially unbonded.

4. Armor according to claim 1 in which the adjacent surfaces of adjacent panels are unbonded, and in which a flexible air-impermeable film is disposed between adjacent panels.

5. Armor according to claim 1 which includes means for sealing the entire periphery of the stack to be airtight.

6. Armor according to claim 1 which includes an airtight, close-fitting bag disposed around the stack.

7. Armor according to claim 1 which includes at least one sheet of thermoplastic film disposed between adjacent panels in the stack.

8. Armor according to claim 1 in which the bonding agent is a thermoplastic film between about 0.0005 inch and about 0.003 inch thick.

9. Armor according to claim 1 which includes between about 2 and about 20 panels in the first group, and between about 2 and about 12 panels in the second group.

10. Armor according to claim 1 in which the layer of bonding agent is no more than about 0.004 inch thick.

11. Armor according to claim 1 in which the thickness of the layer of bonding agent is between about 0.0005 inch and about 0.004 inch.

12. Armor according to claim 1 in which each sheet is at least three times as thick as the bonding layer.

13. Armor according to claim 1 in which each sheet is between about 0.008 inch and about 0.024 inch, and the thickness of the bonding agent layer is no more than about 0.004 inch.

14. Armor according to claim 1 in which the bonding agent is less than about 5 percent by weight of the total weight of the panel.

15. Armor according to claim 1 in which the fibrous material is selected from the group consisting of nylon, polycarbonate and polyamide.

16. Armor according to claim 1 in which at least one of the panels is made of a fibrous material selected from the group consisting of glass, graphite, asbestos, and boron carbide.

17. Armor according to claim 1 in which the bonding agent is selected from the group consisting of polyethylene, polyvinyl chloride, and polyesters.

18. Protective armor comprising a flexible stack of panels, each of the panels in a first group of the stack including between about two and about four adjacent flexible sheets of a fibrous first material secured together with a flexible layer of bonding agent, and each of the panels in a second group of the stack including between about two and about four adjacent sheets of a second material secured together with a flexible layer of bonding agent, the adjacent surfaces of the panels in the stack being substantially unbonded and movable with respect to each other, and the layers of bonding agent each being substantially less thick than the sheets they bond together.

19. Armor according to claim 18 in which the second material is more brittle than the first material.

20. Armor according to claim 19 which includes two stacks of panels, the stacks being spaced apart with the groups of panels of more brittle material in each stack being closer to each other than the majority of the remaining panels in each stack.

21. Armor according to claim 18 which includes panels in a third group in which each panel is a sheet of woven fibrous material in which the fibers are secured together by a layer of bonding agent, the thickness of the layer being substantially less than the thickness of the sheet of each panel in the third group.

22. Armor according to claim 18 in which the adjacent surfaces of the panels are unbonded, and in which a flexible air-impermeable film is disposed between adjacent panels.

23. Armor according to claim 18 in which the second material is a fiber made of a material selected from the group consisting of glass, graphite, asbestos, and boron carbide.

24. Protective armor comprising a flexible stack of first and second groups of flexible panels, each panel in the first group being a flexible sheet of woven fibers of thermoplastic material having a tensile strength of at least 60,000 p.s.i., and each panel in the second group including between about two and about four flexible sheets of fibrous material secured together with a flexible layer of bonding agent, the thickness of the layer being substantially less than the thickness of the sheets, each of the panels in the group being movable with respect to each other.

25. Armor according to claim 24 which includes a third group of panels, the panels in the third group including at least two sheets of fibrous material secured together with a layer of bonding agent, the thickness of the layer being substantially less than the sheets in the panels of the third group, the material of the sheets in the panels of the third group being of a material more brittle than the material in the panels of the first and second groups, and in which the second group of panels is disposed between the first and third group of panels.

26. Armor according to claim 25 in which the stack includes a fourth group of panels, each panel in the fourth group including a flexible sheet of fibrous material coated on one side with a layer of flexible plastic, the coating having a thickness of no more than about one-third the thickness of the sheet.

27. Armor according to claim 26 in which the adjacent surfaces of panels in the stack are substantially unbonded.

28. A panel according to claim 25 which includes a flexible air-impermeable film between adjacent panels.

29. Protective armor comprising a flexible stack of a first group of panels and a second group of panels, each panel in the first group including a flexible sheet of woven fibrous material having a tensile strength greater than about 60,000 p.s.i., each panel in the second group including a flexible sheet of fibrous material coated on one side with a layer of flexible plastic, the coating having a thickness substantially less than that of the sheets in the second group, and the panels being movable with respect to each other.

30. A panel according to claim 29 in which a flexible air-impermeable film is disposed between adjacent panels.

31. Armor according to claim 29 which includes an air-impermeable film disposed between adjacent panels in the second group.

32. Armor according to claim 31 which includes an airtight bag disposed snugly around the stack.

33. Protective armor according to claim 29 which includes an airtight bag disposed snugly around the stack.

34. Protective armor comprising a flexible stack of first and second groups of panels, each panel in the first group including a flexible sheet of woven fibrous material having a tensile strength greater than about 60,000 p.s.i., each panel in the second group including a sheet of flexible material more brittle than the material in the panels of the first group, the panels in the second group each including between two and about four flexible sheets of fibrous material bonded together with a layer of flexible plastic, the layer having a thickness of no more than about one-third that of the thickness of the sheets in the second group, the adjacent surfaces of the panels in the stack being substantially unbonded.

35. Protective armor comprising a stack of flexible sheets of woven fibrous ballistic material, and an air-impermeable film disposed between adjacent sheets in the stack, the film and sheets being movable with respect to each other, and a close-fitting airtight bag sealed around the stack.

36. Protective armor comprising a flexible stack of first and second groups of flexible panels, each panel in the first group including between two and about four flexible sheets of fibrous ballistic material bonded together with spaced layers of bonding agent, each layer of bonding agent being less thick than the sheets it bonds together, each panel in the second group including a flexible sheet of fibrous ballistic material and a layer of bonding agent on one surface of each of the sheets in the second group of panels and being less thick than the sheet which it is on, the individual panels in the stack being movable with respect to each other.

37. Armor according to claim 36 which includes a flexible air-impermeable film disposed between adjacent panels in the stack.